United States Patent [19]

Berndt

[11] Patent Number: 4,781,060
[45] Date of Patent: Nov. 1, 1988

[54] SYSTEM FOR DETECTING WHEEL-DAMAGE

[75] Inventor: Dietmar Berndt, Koblenz, Fed. Rep. of Germany

[73] Assignee: Signaltechnik GmbH, Koblenz, Fed. Rep. of Germany

[21] Appl. No.: 100,305

[22] Filed: Sep. 23, 1987

[30] Foreign Application Priority Data

Mar. 17, 1987 [EP] European Pat. Off. ........ 87103901.2

[51] Int. Cl.$^4$ ........................................... G01M 17/00
[52] U.S. Cl. .................. 73/146; 246/169 R; 340/47; 340/52 R
[58] Field of Search ............. 73/146, 593; 246/169 R; 340/47, 52 R

[56] References Cited

U.S. PATENT DOCUMENTS

| 4,050,292 | 9/1977 | Bloch | 73/593 |
| 4,702,104 | 10/1987 | Hallberg | 73/146 |
| 4,712,423 | 12/1987 | Siffert et al. | 73/146 |

OTHER PUBLICATIONS

Vibetek High Performance Lightweight Polymer Sensor Cable Brochure, Pub. 6/85 by Raychem Limited. 5 pp.
Bulletin; "Piezo Electric Wire", Published by Componex GmbH W. Germany (Date Unk.) 9 pp.
Makktuebersicht, pp. 86, 88, 90, 92, 94–96 of Markt and Technik, No. 27, Jul. 4, 1986.

Primary Examiner—Donald O. Woodiel
Attorney, Agent, or Firm—Gilbert L. Wells

[57] ABSTRACT

The invention concerns a system to detect irregularities in the geometry of railway wheels. The system is characterized in that a linearly expanding accelerometer is solidly joined to the rail underneath its head. The accelerometer sensitivity is constant over its entire length and generates a voltage proportional to the acceleration of the rail. For different damages, the rail acceleration takes place in different directions, whereby the voltage amplitude, depending on the type of damage, evinces opposite polarities. Frequency filtering or frequency analysis permit the determination of further criteria which, together with other weighted criteria, are used to characterize wheel damage.

8 Claims, 2 Drawing Sheets

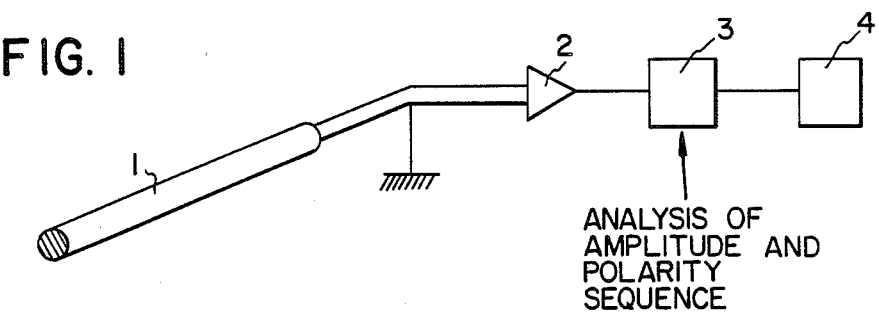
FIG. 1
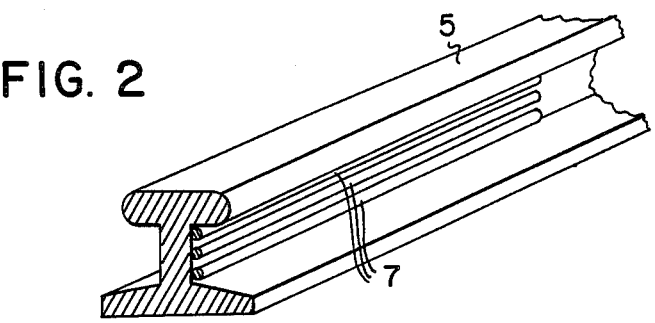
FIG. 2
FIG. 3a
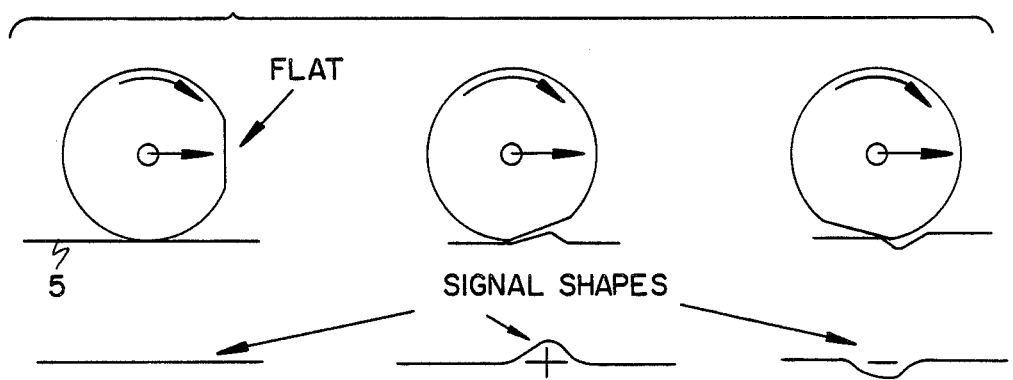

SYSTEM FOR DETECTING WHEEL-DAMAGE

CROSS-REFERENCE TO A RELATED APPLICATION

Applicant claims priority under 35 USC 119 for application No. 87/103901.2 filed Mar. 17, 1987 in the European Patent Office.

BACKGROUND OF THE INVENTION

The invention concerns a system detecting so-called flats and weld-ons on rail-equipment wheels.

Frequently, damages to the wheeltreads of rail-bound vehicles result in rolling irregularities. Such damages are among the following:

flat areas caused by material defects, material ruptures, by grinding from fixed brakes, or accumulations of material (so-called weld-ons), on account of brakes dragging for length of time in the form of brake-shoe material building up on the wheel circumference, and/or abrasion of the wheel.

The resulting running irregularities of the wheels rolling on the rail can directly or indirectly hamper railway operation. Illustratively, the axle bearing may be damaged by the acceleration loads periodically recurring at the same place. Further, there may be rail breakage, especially at lower temperatures. But in every case, such running irregularities cause noise pollution of the environment. All these effects directly affect the economy of railway operation because of the required repairs or steps (noise).

In the past, therefore, a variety of testing steps have been considered and, in part, have even been put to practice to detect flats according to size on a very specific wheel, while, however, being associated with at least the bogie. Illustratively, the state of the art analyzes the amplitudes of high-frequency (hf) track circuits when passed over by a wheel with a flat, the measured effect being a change in resistance between the two rails of one track when the wheel "skips". The test pickups illustratively are strain gauges, which are fastened to the rails and change in resistance when the rail bends horizontally by the impact of a flat. Again, the impact of a flat on the rail can be measured by a piezo-accelerometer mounted on it.

Common to all these devices is that their sensitivity along a rail segment is highly non-linear (hf track circuit) or that the pickup is sensitive only in a very narrow range near its mounting (several cm to each side) along the rail. This fact is based on the physics of detection and much restricts reliable sensing or even classification of the wheel-damage, the damaged site being located randomly on the wheel circumference, and therefore, there is no relation between the impact point and the sensor position at the rail. The state of the art, accordingly, uses very costly analytical algorithms to achieve some linearity in the test result (for instance, in the hf track circuit), or by installing rows of sensors with adjoining or overlapping ranges of sensitivity along the rails. Again, this is not a satisfactory method in the light of the costly installation, the more than trivial sensor costs and the analytical equipment required for a plurality of sensors. This is especially the case for the strain gauges and locally responding accelerometers.

SUMMARY OF THE INVENTION

The object of the invention is to overcome the above-described limitations and drawbacks.

The invention achieves this object by a system evincing the following features, in that it detects irregularities in the geometric shape of wheels of railways in such a manner that an accelerometer (1) which expands linearly is solidly connected over a length at least equal to or larger than the circumference of the largest wheel to be tested below the tread of the wheel (5) and along its longitudinal direction to the rail.

The system is characterized by employing a novel sensor expanding linearly and offering constant and high sensitivity over an arbitrarily long path. This sensor is an accelerometer mounted underneath the top rail surface to this rail along a rail segment.

Practically applicable sensors illustratively are piezo-cables, wherein a piezo-electronic ceramic powder in synthetic rubber is processed into a cable or suitable polymers in the form of foils or cables, illustratively PVDF, polyvinylfluoride or polyvinylchoride, which also are piezoelectric.

The system consists of a solid connection of such an elongated sensor at a suitable location of the rail and to this rail in such a manner that this sensor is connected over its entire length to the rail in such mechanical manner that accelerations on the rail are transmitted everywhere to the sensor. This sensor can be mounted to the rail underneath its head, to its web near the center of mass, or to the base. This connection can be by cementing or welding.

BRIEF DESCRIPTION OF THE DRAWINGS

FIG. 1 is a schematic circuit diagram of the sensor system;

FIG. 2 diagrammatically shows the fixed connection of the accelerometer to the rail;

FIGS. 3a and 3b schematically show possible wheel damages and the signal shapes they generate;

DESCRIPTION OF THE PREFERRED EMBODIMENTS

FIG. 1 schematically shows the sensing system. A linearly expanding accelerometer is denoted by 1 and illustratively may be a piezo-cable. It feeds a charge-sensitive amplifier 2 followed by an analyzing electronics 3 and a display 4.

The analyzing electronics may both analyze the amplitude and the polarity sequence of the signal generated by the accelerometer 1.

The mounting of the accelerometer 1 on the rail is shown in FIG. 2. The rail is denoted by 5; the accelerometer is fixed to the rail at various locations, as shown, for instance by cementing. The kind of mounting is immaterial so long as a solid connection to the rail is established.

The detection made possible by the described sensor system is based on the fact that an accelerometer of the type shown generates a charge Q which is converted by the charge-sensitive amplifier 2 into a test voltage and is extensively linear over a wide range of accelerations. (from a few g to several thousand g) and is a measure of the acceleration that took place. The advantage of linear dependence of response to input can be utilized when the sensitivity of the accelerometer is constant regardless of the location of impact between wheel defect and rail. This can be achieved only when using an accelerometer of the type described above in the system shown. As a result, the analyzing procedure is simple and single-channel, and provides reliable indication of the extent of wheel damage as a function also of other weighted parameters such as vehicle speed and weight.

Figure 3B:
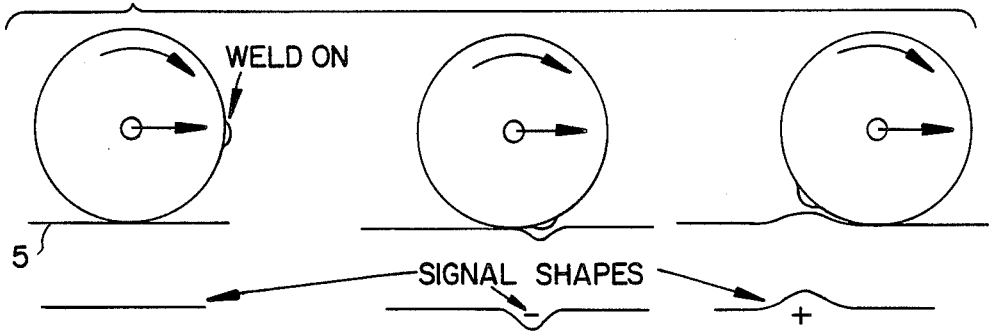

The system described in principle above further provides for further analysis of specific characteristics of the test signals that may shed light on the kind of wheel damage. Accordingly, the characterization of wheel damage can be also through the signal polarity besides the signal amplitude. If, for instance, there is a weld on the rail above the accelerometer, then the rail first is accelerated down and then very shortly will swing up before the smooth wheel tread rests on it again. As a result, the test pulse assumes a specific polarity with subsequent charge reversal, that is reversal of signal (FIG. 3b).

On the other hand, when a flat impinges on the rail, this rail is slightly load-relieved when the wheel "skips" and then it swings up to be accelerated down by the impact of the flat's edge. In this case too, the accelerometer also generates a bipolar signal, however, the sign sequence will be reversed. This sign sequence can be easily used to characterize the type of wheel damage in the analysis (FIG. 1, together with FIG. 3a). As already discussed, this test procedure can only be carried out if the accelerometer evinces constant sensitivity over at least the length of the circumference developed on the rail of such a damaged wheel.

The above-described system also makes it possible to derive further criteria to more closely describe the extent of the damage. Illustratively, the frequency spectrum of the acceleration pulse when combined with other weighted parameters such as speed and wheel-load reveals much about the extent of the damage. A test procedure is proposed in this respect which by means of suitable filter stages (FIG. 4) and/or FFT analysis (FIG. 5) which can be rapidly and reliably implemented with present-day rapid microprocessors; can pick further criteria out of the test signals, where those criteria are characteristic of specific wheel conditions.

This test procedure, carried out by the proposed system, benefits from the fact that the proposed types of accelerometers respond over a wide signal frequency range while the sensitivity of the test system, however, rapidly vanishes beyond the ends of the stretched accelerometer. Such frequency analysis assumes that the accelerometer be sensitive along a well-defined path, because events taking place outside the accelerometer and affecting the rail do not contribute to the test signal and accordingly, an adequate signal-to-noise gap is provided. This differentiates the proposed system in essential manner from other methods and arrangements, for instance, acoustic transmission in the rail, whereby a train with multiple wheel damages delivers a blurred mixture of acoustic events from a long path to such a sensor, and accordingly, localized analysis becomes practically impossible.

BEST MODES FOR CARRYING OUT THE INVENTION

Figure 4:
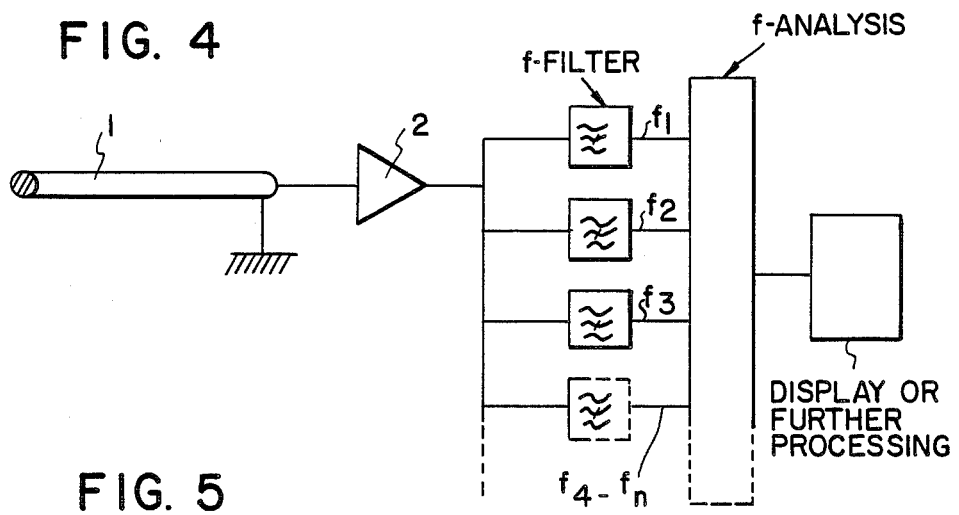
FIG. 4 is a block diagram of the sensor system with a frequency filter stage.
Figure 5:
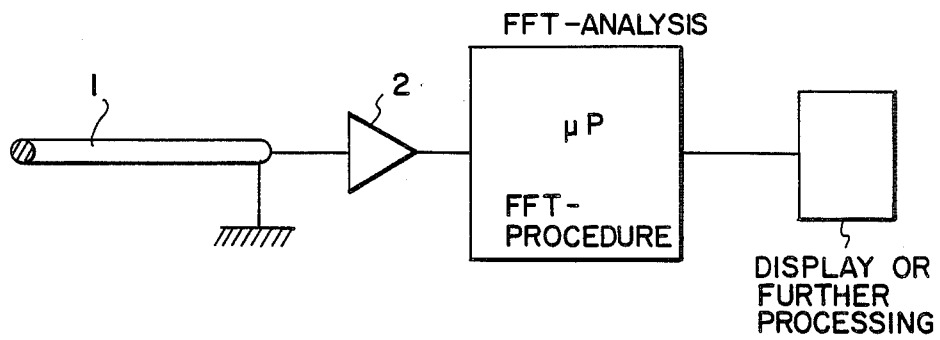
FIG. 5 is a block diagram of the frequency filter stage with frequency analysis of the signal.

In the best modes for carrying out the invention, the piezo-cables (1) are sold by COMPONEX GmbH, Duesseldorf, W. Germany and designated RWC - 500 - 32 - C. The f-filter and f analysis of FIG. 4 are sold by BURR - BROWN, Duesseldorf, W. Germany and designated as UAF 41. The FFT analysis of FIG. 5 is performed by Ms 430A as reported by Markt and Technik p. 86, No. 27 of July 4, 1986.

I claim:

1. A system for detecting irregularities in the geometric shape of a railway wheel having a give circumference running on a rail having a head comprising a linearly expanding accelerometer (1) solidly joined to said rail and having a length equal to or longer than said circumference below said head of said rail (5) and in its longitudinal direction.

2. The system of claim 1, wherein said accelerometer (1) is a piezo-cable.

3. The system of claim 2, wherein said accelerometer (1) has means for feeding a charge-sensitive amplifier (2) to recognize the polarity of a signal sequence, and said signal in turn, has means for an analyzing electronics (3).

4. The system of claim 2, wherein said accelerometer (1) is connected in series with a charge-sensitive amplifier (2), a frequency filter and an electronic component for frequency analysis.

5. The system of claim 2, wherein said accelerometer (1) is connected in series with a charge-sensitive amplifier (2) and an electronic component having means for carrying out FFT analysis.

6. The system of claim 1, wherein said accelerometer (1) has means for feeding a charge-sensitive amplifier (2) to recognize the polarity of a signal sequence and said signal in turn has means for feeding an analyzing electronics (3).

7. The system of claim 1, wherein said accelerometer (1) is connected in series with a charge-sensitive amplifier (2), a frequency filter and an electronic component for frequency analysis.

8. The system of claim 1, wherein said accelerometer (1) is connected in series with a charge-sensitive amplifier (2) and an electronic component having means for carrying out FFT analysis.

* * * * *